(12) United States Patent
Narendra Trivedi et al.

(10) Patent No.: US 9,092,644 B2
(45) Date of Patent: Jul. 28, 2015

(54) METHOD AND SYSTEM FOR PROTECTING MEMORY INFORMATION IN A PLATFORM

(75) Inventors: Alpa T. Narendra Trivedi, Hillsboro, OR (US); David M. Durham, Beaverton, OR (US); Men Long, Beaverton, OR (US); Siddhartha Chhabra, Hillsboro, OR (US); Uday R. Savagaonkar, Portland, OR (US); Carlos V. Rozas, Portland, OR (US)

(73) Assignee: Intel Corporation, Santa Clara, CA (US)

(*) Notice: Subject to any disclaimer, the term of this patent is extended or adjusted under 35 U.S.C. 154(b) by 64 days.

(21) Appl. No.: 13/976,935

(22) PCT Filed: Dec. 28, 2011

(86) PCT No.: PCT/US2011/067586
§ 371 (c)(1),
(2), (4) Date: Jun. 27, 2013

(87) PCT Pub. No.: WO2013/100964
PCT Pub. Date: Jul. 4, 2013

(65) Prior Publication Data
US 2014/0208109 A1 Jul. 24, 2014

(51) Int. Cl.
*G06F 21/64* (2013.01)
*H04L 9/06* (2006.01)
*G06F 12/14* (2006.01)
*G06F 21/78* (2013.01)
*G06F 21/79* (2013.01)

(52) U.S. Cl.
CPC ............ *G06F 21/64* (2013.01); *G06F 12/1408* (2013.01); *G06F 21/78* (2013.01); *G06F 21/79* (2013.01); *H04L 9/0643* (2013.01); *H04L 2209/12* (2013.01)

(58) Field of Classification Search
CPC . G06F 12/1408; G06F 21/64; G06F 12/1425; H04L 9/0643
See application file for complete search history.

(56) References Cited

U.S. PATENT DOCUMENTS

| | | |
|---|---|---|
| 2004/0187012 A1* | 9/2004 | Kohiyama et al. ............. 713/193 |
| 2006/0161773 A1* | 7/2006 | Okazaki et al. ................ 713/168 |
| 2011/0119498 A1 | 5/2011 | Guyot |
| 2011/0123020 A1* | 5/2011 | Choi et al. ...................... 380/28 |
| 2011/0154059 A1 | 6/2011 | Durham et al. |
| 2012/0079283 A1* | 3/2012 | Hashimoto et al. ........... 713/189 |

OTHER PUBLICATIONS

International Preliminary Report on Patentability for PCT Patent Application No. PCT/US2011/067586 mailed Jul. 10, 2014, 6 pages.
International Search Report and Written Opinion for PCT Patent Application No. PCT/US2011/067586 Mailed Sep. 7, 2012, 9 pages.

* cited by examiner

*Primary Examiner* — Gilberto Barron, Jr.
*Assistant Examiner* — Arya Golriz
(74) *Attorney, Agent, or Firm* — Lowenstein Sandler LLP

(57) ABSTRACT

A method and system to provide an effective, scalable and yet low-cost solution for Confidentiality, Integrity and Replay protection for sensitive information stored in a memory and prevent an attacker from observing and/or modifying the state of the system. In one embodiment of the invention, the system has strong hardware protection for its memory contents via XTS-tweak mode of encryption where the tweak is derived based on "Global and Local Counters". This scheme offers to enable die-area efficient Replay protection for any sized memory by allowing multiple counter levels and facilitates using small counter-sizes to derive the "tweak" used in the XTS encryption without sacrificing cryptographic strength.

27 Claims, 3 Drawing Sheets

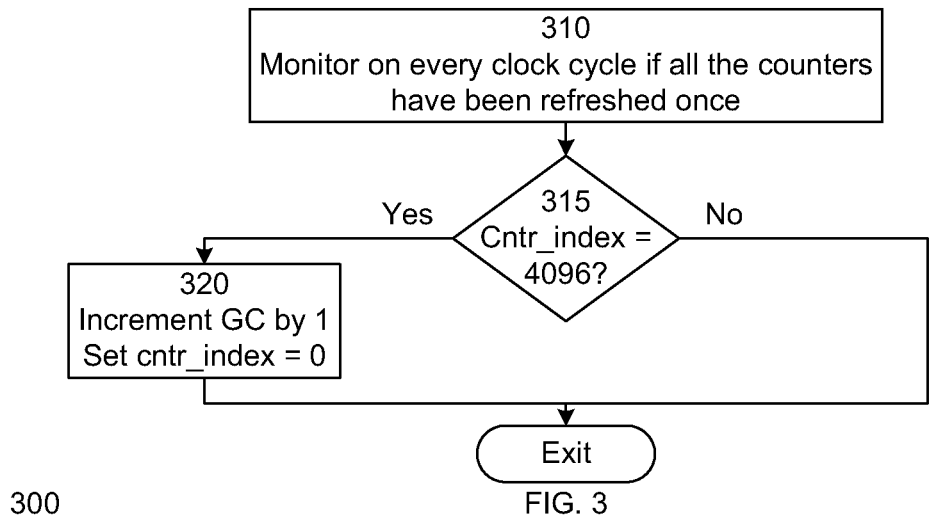
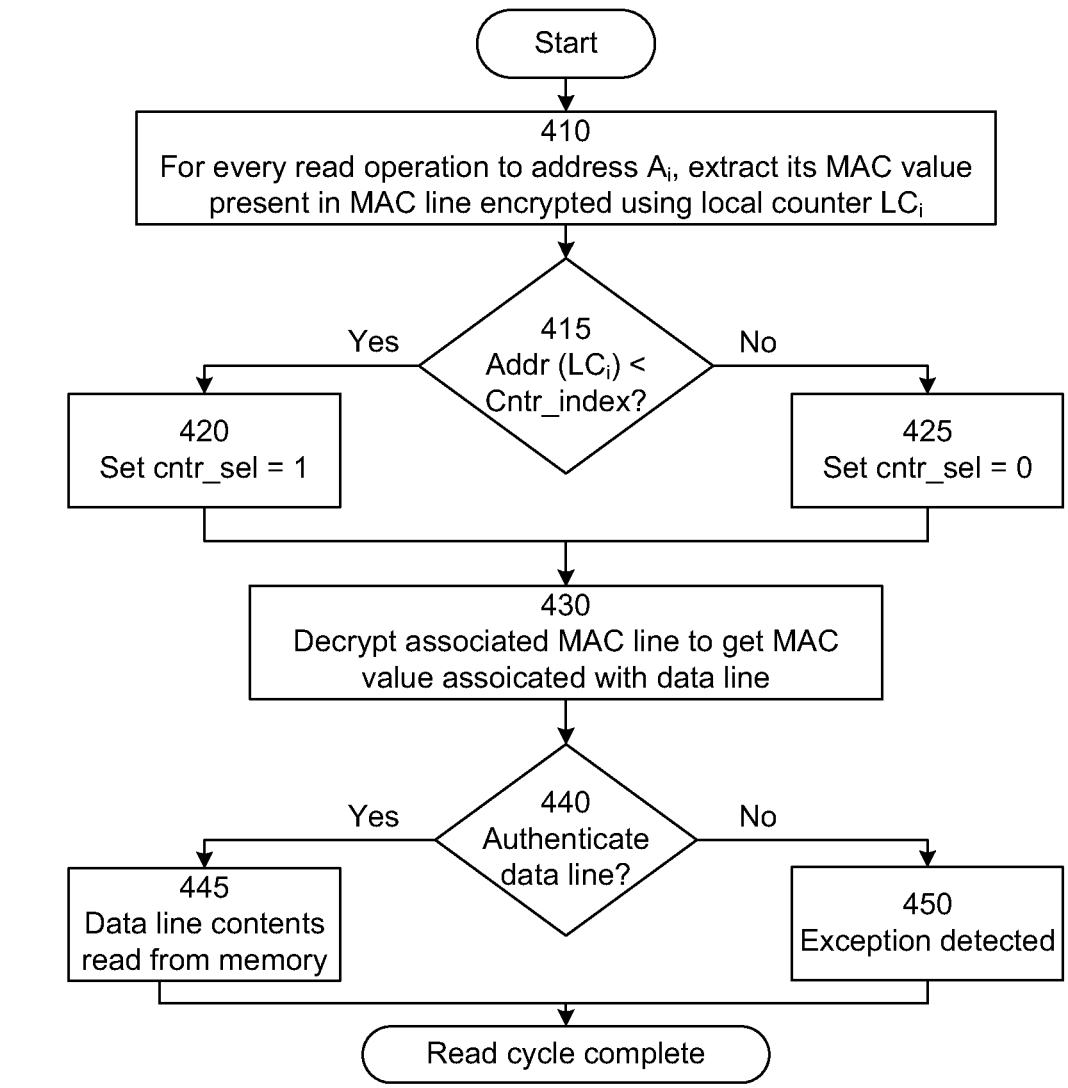

METHOD AND SYSTEM FOR PROTECTING MEMORY INFORMATION IN A PLATFORM

CLAIM OF PRIORITY

This application is a U.S. National Phase application under 35 U.S.C. §371 of International Application No. PCT/US2011/067586, filed Dec. 28, 2011, entitled "METHOD AND SYSTEM FOR PROTECTING MEMORY INFORMATION IN A PLATFORM," the entire contents of which are incorporated herein by reference.

FIELD OF THE INVENTION

This invention relates to a platform, and more specifically but not exclusively, to a method and system for protecting memory information in a platform.

BACKGROUND DESCRIPTION

Merkle trees are often used for memory authentication. A Merkle tree is a tree of Message Authentication Codes (MACs) that is computed over the replay-protected memory. The root of the Merkle tree is stored securely in an on-chip register in the processor. When a memory data line is accessed, its integrity is verified by checking its chain of MACs to the root of the Merkle tree. This approach, however, can result in significant performance and storage overheads due to the large number of MACs that need to be potentially fetched to verify the integrity of the memory data line.

To optimize the process, the MAC values can be cached in the Last Level Cache (LLC) and the verification stops on finding the first MAC along the tree in the LLC. While this approach reduces the performance overheads by reducing the number of MACs that need to fetched and computed to verify the memory data line, it disturbs the contents of the LLC.

BRIEF DESCRIPTION OF THE DRAWINGS

The features and advantages of embodiments of the invention will become apparent from the following detailed description of the subject matter in which:

FIG. 3 illustrates an operation to update the global counter in accordance with one embodiment of the invention;

FIG. 4 illustrates a read operation in accordance with one embodiment of the invention.

DETAILED DESCRIPTION

Figure 1:
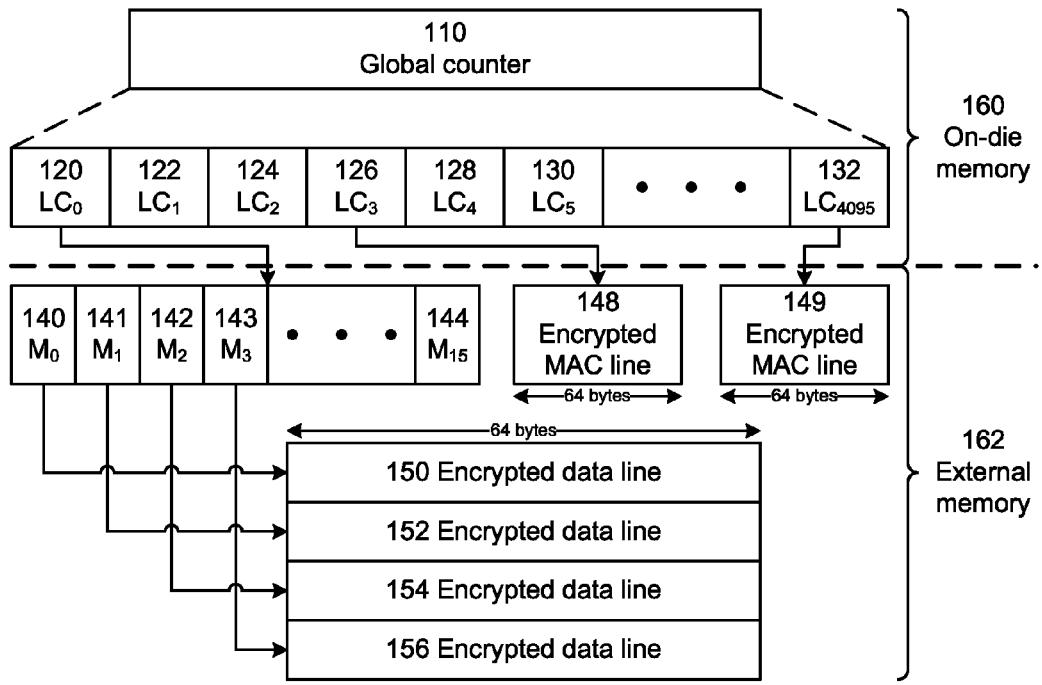
FIG. 1 illustrates a block diagram of the memory protection logic in accordance with one embodiment of the invention.

Embodiments of the invention described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements. Reference in the specification to "one embodiment" or "an embodiment" of the invention means that a particular feature, structure, or characteristic described in connection with the embodiment is included in at least one embodiment of the invention. Thus, the appearances of the phrase "in one embodiment" in various places throughout the specification are not necessarily all referring to the same embodiment.

Embodiments of the invention provide a method and system for protecting memory information in a platform or system. For clarity of illustration, unencrypted sensitive data is referred to as plain text and encrypted data is referred to as cipher text in one embodiment of the invention. The protection of the memory information includes, but is not limited to, confidentiality protection, forgery protection and replay protection.

In one embodiment of the invention, Confidentiality Protection (CP) prevents an attacker in recovering plaintext from cipher text. The retention time of a main memory module such as a dynamic random access memory (DRAM) is important to guarantee that there is no loss of data for security concerns as the DRAM may retain significant sensitive data that should be kept undisclosed. For example, a cold boot attack is a potential attack where an attacker with physical access to the system can exploit the DRAM retention time to recover sensitive data off the main memory.

In another example, the cryptographic key used to encrypt hard the drive may reside in the DRAM. Since the DRAM contents get erased progressively, the contents are accessible for a short period after power down. The access time of the DRAM contents can be further increased from a few seconds to minutes by cooling the DRAM chip. This enables the attackers to successfully read the disk encryption keys off the DRAM by moving the cooled DRAM chip from one computer to another, thereby breaking the hard drive encryption.

In one embodiment of the invention, Forgery Protection (FP) prevents an attacker from causing any hidden modifications to the cipher text. For example, data may be modified either accidently through hardware or transmission errors or in a deliberate malicious purpose. In either case, the consequences may be quite unpredictable. For example, it can cause execution-flow corruption to leak cryptographic secrets stored in the DRAM.

In one embodiment of the invention, Replay Protection (RP) eliminates any undetected temporal substitution of the cipher text. Web applications for instance can be easily exploited using Replay attacks to cause malicious results. For example, when a user is performing a financial transaction using a web application to verify his login credentials such as username and password, a hacker can capture the packets and replay these packets in the network traffic over a period of time and get access to the user's financial accounts. The hacker could also change the sequence of previous packets to modify program behavior causing undesirable consequences.

Embodiments of the invention provide an effective, scalable and yet low-cost solution for Confidentiality, Integrity and Replay protection for sensitive information stored in a memory and prevent an attacker from observing and/or modifying the state of the system. In one embodiment of the invention, the system has strong hardware protection for its memory contents via encryption and authentication techniques that are designed specifically to obtain higher performance metrics by ensuring that the normal processor or Central Processing Unit (CPU) execution flow is unaltered by the deployed cryptographic techniques. By doing so, it reduces the cost by saving die area without sacrificing cryptographic strength.

In one embodiment of the invention, the security sensitive data or memory contents of the platform are encrypted using an appropriate Encryption/Decryption algorithm. In one embodiment of the invention, the encryption engine is placed between the LLC and the external memory of the platform.

Whenever data is evicted off the processor chip or module in the platform, the data is encrypted and stored in the main memory of the platform in one embodiment of the invention. By doing so, it eliminates the possibility of an attacker observing plaintext data outside the boundary of the processor chip in one embodiment of the invention. The encryption/decryption algorithm includes, but is not limited to, an XEX [exclusive OR (XOR) followed by encryption followed by XOR] based tweaked mode with Cipher Text Stealing (XTS) mode of encryption to encrypt the Data-lines and Liskov, Rivest, and Wagner (LRW) Advanced Encryption Scheme (AES) (LRW-AES).

XTS-AES is a tweakable block cipher that acts on data units of 128 bits or more and uses the AES block cipher as a subroutine. The key for XTS-AES consists of a data encryption key (used by the AES block cipher) as well as a "tweak key" that is used to incorporate the logical position of the data block into the encryption. In one embodiment of the invention, the unique tweak key is derived based on counters and it shall be explained later.

The memory encryption ensures that the confidentiality of the data is retained. In one embodiment of the invention, replay protection is provided by encrypting the sensitive memory contents and authenticating them by creating a hash or Message Authentication Code MAC (MAC). Each MAC is associated with an encrypted data line in one embodiment of the invention.

In one embodiment of the invention, the system has strong hardware protection for its memory contents via XTS-tweak mode of encryption where the tweak is derived based on "Global and Local Counters". This scheme offers to enable die-area efficient Replay protection for any sized memory by allowing multiple counter levels and facilitates using small counter-sizes to derive the "tweak" used in the XTS encryption without sacrificing cryptographic strength. In one embodiment of the invention, the counter tree can be multi-level, and when it is multilevel, the intermediate levels do not need MACs. Only the last level in the tree would need to have MAC values to determine the integrity of the encrypted data lines. In this scheme, if any of the counters are disturbed and/or the data line itself is disturbed, that last level MAC will not compute correctly.

For a prior Merkel tree, it requires full sized MACs that ensure no overflow can happen. In one embodiment of the invention, by trading MACs for counters, smaller sized counter values can be utilized and these counters are refreshed before they repeat any values. This removes the possibility of replaying a previous data line and since only data writes will increment the counter values, reads from memory will not cause any refreshing of the tree.

FIG. 1 illustrates a block diagram 100 of the memory protection logic in accordance with one embodiment of the invention. For clarity of illustration, a cache memory line that stores data is referred to as a data line and a cache memory line that stores MACs is referred to as MAC line. In the block diagram 100, the data is assumed to be stored in a cache memory with a line width of 64 bytes when the data is evicted from the processing unit to the external memory 162. The block diagram 100 illustrates the global counter 110 and the Local Counters (LCs) that are stored in the on-die memory 160 and the encrypted MAC cache memory lines and encrypted data lines that are stored in the external memory 162.

In one embodiment of the invention, the contents of the cache memory data lines are encrypted using an appropriate encryption algorithm and is authenticated by generating a MAC with a MAC length of m. The generated MACs are coalesced or concatenated into a cache memory line of size L. m can be any suitable integer value in one embodiment of the invention.

For example, in FIG. 1, the MAC length m is illustrated as 4 bytes and 16 MACs are put together into a single cache memory line of size 64 bytes (L is illustrated as 64 bytes). Each MAC is associated with an encrypted data line in one embodiment of the invention.

For example, $MAC_0$ ($M_0$) 140, $M_1$ 141, $M_2$ 142, $M_3$ 143 and $M_{15}$ 144 illustrate 16 encrypted MACs that are coalesced into a single MAC line of 64 bytes. In FIG. 1, the block diagram 100 illustrates 4096 (4k) local counters that are shown as $LC_0$ 120, $LC_1$ 122, $LC_2$ 124, $LC_3$ 126, $LC_4$ 128, $LC_5$ 130, and $LC_{4095}$ 132. Each of the MACs in the MAC lines is used for authenticating the encrypted data line. For example, $M_0$ 140, $M_1$ 141, $M_2$ 142, and $M_3$ 143 are used for authenticating the encrypted data lines 150, 152, 154, and 156 respectively.

For each MAC and data line, it is encrypted using the local counters. For example, in one embodiment of the invention, each MAC is encrypted using XEX based tweaked mode with XTS mode of encryption. The tweak used in the encryption is derived based on the memory address and the local counters which are incremented only for data write operations in one embodiment of the invention. By storing the local counters and the global counter 110 in the on die memory 160, it prevents an attacker from gaining access to the information stored in the memory in one embodiment of the invention.

Each LC is assumed to have 16 bits in FIG. 1. In the current illustration, each LC rolls over after $2^{16}$ write cycles, assuming that each LC is incremented by 1 only for a data write operation in one embodiment of the invention. At each roll over, the LC are reset or all set to their default count value. The data read operation is comparatively simplified for higher performance in one embodiment of the invention.

In one embodiment of the invention, every time a LC value changes, a unique tweak is generated and the corresponding MAC line is encrypted adhering to the XTS encryption protocol. To ensure that the tweak used for encryption is always unique, the global counter 110 is added in the on-die memory 160 in one embodiment of the invention. When all the 4k LCs have been refreshed or set all to zeros, the global counter is incremented by 1 in one embodiment of the invention. By ensuring that the tweak generated for each data write operation is unique, the probability of having a collision in a single power-on CPU life-cycle becomes void.

In one embodiment of the invention, each of the LCs are refreshed using a round robin manner or in a serial sequence. In another embodiment of the invention, each of the LCs are refreshed based on the usage frequency of the data line. For example, the LC associated with the most written data line is given priority for refresh in one embodiment of the invention.

Figure 2:
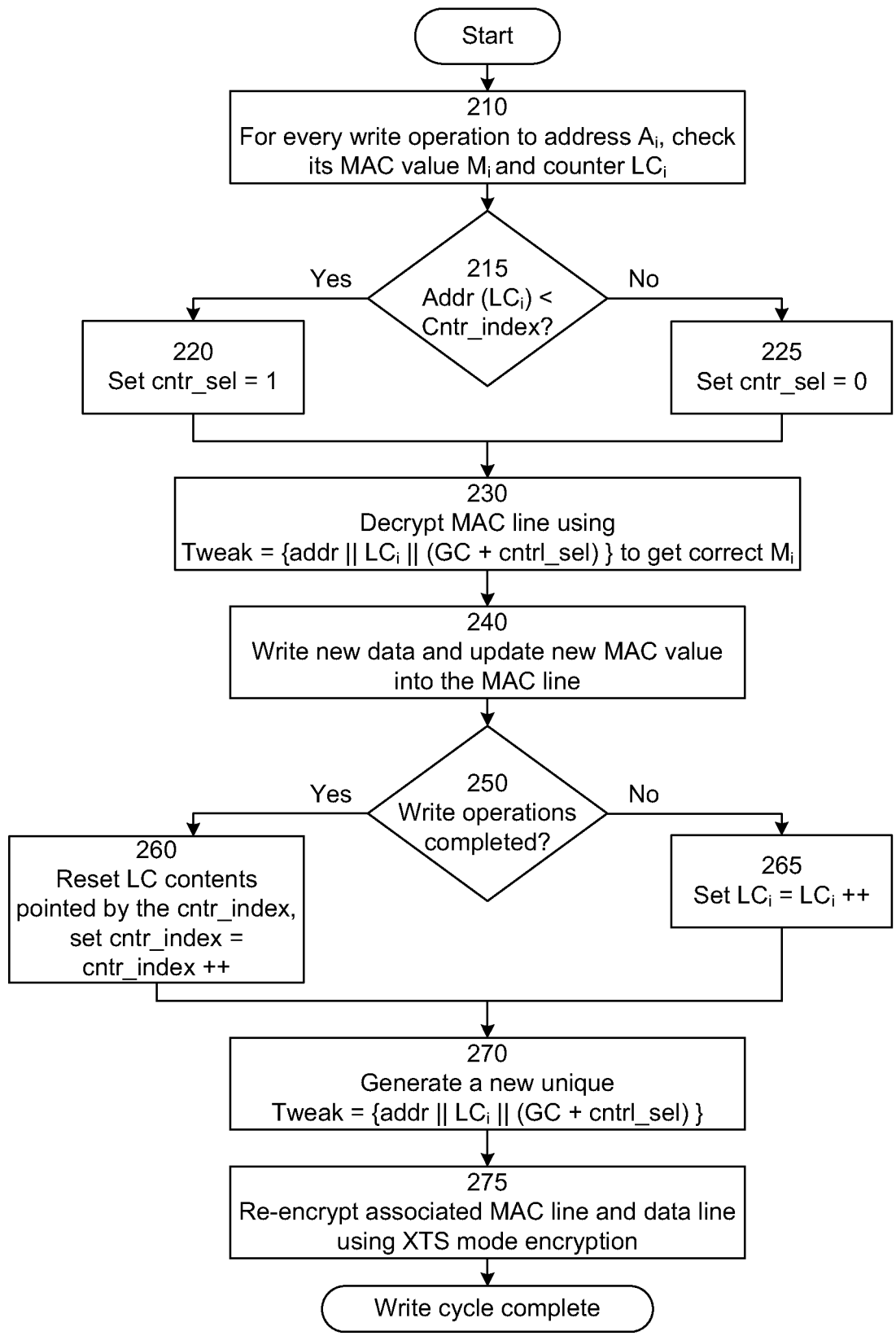
FIG. 2 illustrates a write operation in accordance with one embodiment of the invention.

FIG. 2 illustrates a write operation 200 in accordance with one embodiment of the invention. For clarity of illustration, FIG. 2 is discussed with reference to FIG. 1. In step 210, for every write operation to address $A_i$, the associated MAC value $M_i$ and associated counter $LC_i$ is determined. In step 215, it checks whether the address of the associated counter $LC_i$ is less than the counter index (cntr_index).

In one embodiment of the invention, the cntr_index indicates the current local counter that needs to be refreshed upon completion of an update interval. For example, for the local counters illustrated in FIG. 1, the cntr_index has 12 bits to indicate which one of the 4096 local counters that need to be refreshed upon completion of an update interval.

In FIG. 1, it is assumed that there are 4K Local counters and each counter has a size of 16 bits. Assuming that each LC is incremented only for a write operation, the update interval is determined by $2^{(16-12)}=16$ write cycles. In one embodiment of the invention, the LC contents are refreshed periodically with the update interval as the period and in a round-robin manner.

If the address of the associated counter $LC_i$ is less than the cntr_index, the counter select (cntr_sel) is set to 1 in step 220. In one embodiment of the invention, the counter select indicates which data lines use the updated or older Global counter value as a part of the tweak used in encryption. If the address of the associated counter $LC_i$ is greater than the cntr_index, the counter select (cntr_sel) is set to 0 in step 220.

In step 230, the MAC line is decrypted using a tweak to get the correct MAC value $M_i$. In one embodiment of the invention, the tweak is determined from: Tweak={addr||$LC_i$||(GC+cntrl_sel)}. The tweak is generated by concatenating the Address $A_i$, the $LC_i$, and the sum of the global counter value with the cntrl_sel in one embodiment of the invention.

In step 240, the new data for the write operation is written and the correct MAC value obtained from step 230 is updated in the MAC line. In step 250, it checks whether 16 write operations are completed. If yes, the contents of the LC pointed to by the cntr_index is resetted and the cntr_index is incremented by one in step 260. If no, the $LC_i$ is incremented by one in step 265.

In step 270, a new unique tweak is generated using the formula: Tweak={addr||$LC_i$||(GC+cntrl_sel)}. In step 275, the associated MAC line and data line are re-encrypted using the XTS mode encryption based on the new unique tweak and the write cycle is completed.

The write operation 200 allows small counter values to be used and it keeps on-die area overheads to a minimum while dealing with counter rollover to avoid altering a program execution flow in one embodiment of the invention.

FIG. 3 illustrates an operation 300 to update the global counters in accordance with one embodiment of the invention. For clarity of illustration, FIG. 3 is discussed with reference to FIG. 1. In step 310, it monitors on every clock cycle if all the local counters have been refreshed once. In step 315, it checks if the cntr_index has reached 4096. If yes, the global counter 110 is incremented by one and the cntr_index is set to zero or reset and the flow ends. If no, the flow ends.

FIG. 4 illustrates a read operation 400 in accordance with one embodiment of the invention. For clarity of illustration, FIG. 4 is discussed with reference to FIG. 1. In step 410, for every read operation to address $A_i$, the MAC value is extracted from its associated MAC line using the associated local counter $LC_i$. In step 415, it checks whether the address of the associated counter $LC_i$ is less than the cntr_index.

If the address of the associated counter $LC_i$ is less than the cntr_index, the counter select (cntr_sel) is set to 1 in step 420. If the address of the associated counter $LC_i$ is greater than the cntr_index, the counter select (cntr_sel) is set to 0 in step 425.

In step 430, the associated MAC line is decrypted using a tweak to get the MAC value associated with the data line. In step 440, it checks whether the data line is authenticated successfully using the MAC value obtained in step 430. If yes, the contents of the data line are read from the memory and the read cycle ends. If no, an exception is generated to indicate the unsuccessful authentication of the data line and the read cycle ends.

The write and read operations illustrated do not disturb the LLC contents and require, at the maximum, one MAC to be fetched and computed to verify the integrity of a line. Compared to the n MACs that might need to be fetched for a prior art Merkle tree approach, embodiments of the invention provide a more efficient way that does not alter a program execution flow.

In another embodiment of the invention, the counters illustrated in FIG. 1 can be extended to a N-level tree to allow coverage for more memory. For example, each individual LC (local counter) on the die can reference a cache line of counters in memory ($L_2C_i$), and each of these counters can reference another line of counters ($L_3C_i$) and so on until the last set of counters is reached ($L_NC_i$), where each these counters is associated with a cache line of MACs at the bottom leafs of the tree (as illustrated by the encrypted MAC line in FIG. 1).

The tweak for the N-level tree is changed to:

$$\text{Tweak}=\{\text{addr}\|LC_i\|L_2C_i\|\ldots\|L_NC_i\|(GC+\text{cntrl\_sel})\}.$$

One of ordinary skill in the relevant will readily appreciate the workings of the N-level tree based on the FIGS. 1 to 4 and shall not be described herein.

Figure 5:
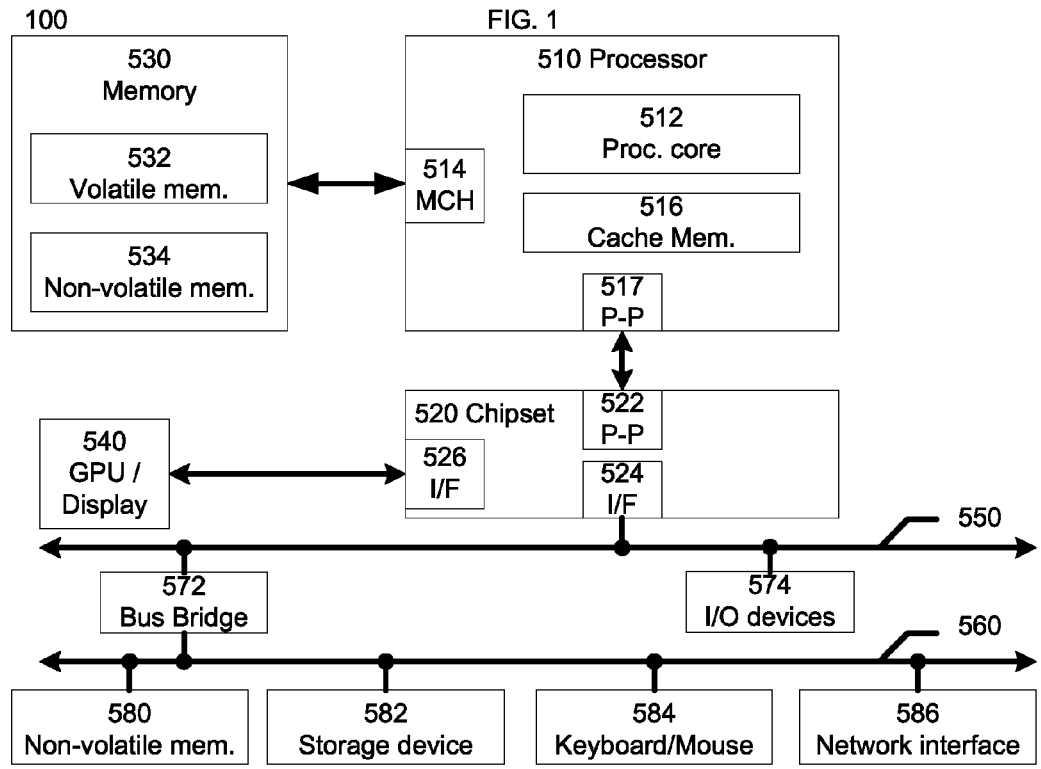
FIG. 5 illustrates a system to implement the methods disclosed herein in accordance with one embodiment of the invention.

FIG. 5 illustrates a system or platform 500 to implement the methods disclosed herein in accordance with one embodiment of the invention. The system 500 includes, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device. In another embodiment, the system 500 used to implement the methods disclosed herein may be a system on a chip (SOC) system.

The processor 510 has a processing core 512 to execute instructions of the system 500. The processing core 512 includes, but is not limited to, pre-fetch logic to fetch instructions, decode logic to decode the instructions, execution logic to execute instructions and the like. The processor 510 has a cache memory 516 to cache instructions and/or data of the system 500. In another embodiment of the invention, the cache memory 516 includes, but is not limited to, level one, level two and level three, cache memory or any other configuration of the cache memory within the processor 510.

The memory control hub (MCH) 514 performs functions that enable the processor 510 to access and communicate with a memory 530 that includes a volatile memory 532 and/or a non-volatile memory 534. The volatile memory 532 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 534 includes, but is not limited to, NAND flash memory, phase change memory (PCM), read only memory (ROM), electrically erasable programmable read only memory (EEPROM), or any other type of non-volatile memory device.

The memory 530 stores information and instructions to be executed by the processor 510. The memory 530 may also stores temporary variables or other intermediate information while the processor 510 is executing instructions. The chipset 520 connects with the processor 510 via Point-to-Point (PtP) interfaces 417 and 522. The chipset 520 enables the processor 510 to connect to other modules in the system 500. In another embodiment of the invention, the chipset 520 is a platform controller hub (PCH). In one embodiment of the invention, the interfaces 517 and 522 operate in accordance with a PtP communication protocol such as the Intel® QuickPath Interconnect (QPI) or the like. The chipset 520 connects to a GPU or a display device 540 that includes, but is not limited to, liquid crystal display (LCD), cathode ray tube (CRT) display, or any other form of visual display device. In another embodiment of the invention, the GPU 540 is not connected to the chipset 520 and is part of the processor 510 (not shown).

In addition, the chipset 520 connects to one or more buses 550 and 560 that interconnect the various modules 574, 580, 582, 584, and 586. Buses 550 and 560 may be interconnected together via a bus bridge 572 if there is a mismatch in bus speed or communication protocol. The chipset 520 couples with, but is not limited to, a non-volatile memory 580, a mass storage device(s) 582, a keyboard/mouse 584 and a network interface 586. The mass storage device 582 includes, but is not limited to, a solid state drive, a hard disk drive, an universal serial bus flash memory drive, or any other form of computer data storage medium. The network interface 586 is implemented using any type of well known network interface standard including, but not limited to, an Ethernet interface, a universal serial bus (USB) interface, a Peripheral Component Interconnect (PCI) Express interface, a wireless interface and/or any other suitable type of interface. The wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 5 are depicted as separate blocks within the system 500, the functions performed by some of these blocks may be integrated within a single semiconductor circuit or may be implemented using two or more separate integrated circuits. The system 500 may include more than one processor/processing core in another embodiment of the invention.

The methods disclosed herein can be implemented in hardware, software, firmware, or any other combination thereof. Although examples of the embodiments of the disclosed subject matter are described, one of ordinary skill in the relevant art will readily appreciate that many other methods of implementing the disclosed subject matter may alternatively be used. In the preceding description, various aspects of the disclosed subject matter have been described. For purposes of explanation, specific numbers, systems and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

The term "is operable" used herein means that the device, system, protocol etc, is able to operate or is adapted to operate for its desired functionality when the device or system is in off-powered state. Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

The techniques shown in the figures can be implemented using code and data stored and executed on one or more computing devices such as general purpose computers or computing devices. Such computing devices store and communicate (internally and with other computing devices over a network) code and data using machine-readable media, such as machine readable storage media (e.g., magnetic disks; optical disks; random access memory; read only memory; flash memory devices; phase-change memory) and machine readable communication media (e.g., electrical, optical, acoustical or other form of propagated signals—such as carrier waves, infrared signals, digital signals, etc.).

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A processor comprising:
    a global counter;
    a multilevel counter tree comprising a plurality of local counters, wherein a last level of the multilevel counter tree is associated with a plurality of Message Authentication Code (MAC) lines; and
    logic to perform a write operation to a memory address, wherein the logic is to decrypt one of the MAC lines associated with the memory address using a tweak based on one or more of the memory address, the global counter, a local counter associated with the one MAC line, and a counter indication bit to obtain a MAC value.

2. The processor of claim 1, wherein the logic to perform the write operation to the memory address is further to:
    determine whether an address of the local counter associated with the one MAC line is greater than a counter index;
    assert the counter indication bit in response to a determination that the address of the local counter associated with the one MAC line is lesser than the counter index; and
    de-assert the counter indication bit in response to a determination that the address of the local counter associated with the one MAC line is greater than the counter index.

3. The processor of claim 2, wherein the logic to perform the write operation to the memory address is further to:
    write data to the memory address; and
    update the one MAC line associated with the memory address with the MAC value.

4. The processor of claim 3, wherein the logic to perform the write operation to the memory address is further to:
    determine whether an update interval has been reached;
    if so,
        reset one of the plurality of local counters associated with the current counter; and
        increment the counter index by one; and
    if not so,
        increment the local counter associated with the one MAC line by one.

5. The processor of claim 4, wherein the logic to perform the write operation to the memory address is further to:
    determine another tweak based on one or more of the memory address, the global counter, the local counter associated with the one MAC line, and the counter indication bit; and
    encrypt the one MAC line associated with the memory address using the other tweak.

6. The processor of claim 1, wherein the logic is further to:
    determine whether a counter index is set to its maximum value; and
    in response to a determination that the counter index is set to its maximum value, increment the global counter by one; and
    set the counter index to zero.

7. The processor of claim 1, wherein the logic is further to perform a read operation to the memory address, wherein the logic is to decrypt the one MAC line associated with the memory address using the tweak to obtain the MAC value.

8. The processor of claim 7, wherein the logic to perform the read operation to the memory address is further to:
   determine whether an address of the local counter associated with the one MAC line is greater than a counter index;
   assert the counter indication bit in response to a determination that the address of the local counter associated with the one MAC line is lesser than the counter index; and
   de-assert the counter indication bit in response to a determination that the address of the local counter associated with the one MAC line is greater than the counter index.

9. The processor of claim 8, wherein the logic to perform the read operation to the memory address is further to:
   authenticate a data line associated with the memory address using the MAC value; and
   read contents of the data line in response to a successful authentication of the data line associated with the memory address using the MAC value.

10. A system comprising:
   a memory; and
   a processor coupled with the memory, the processing comprising:
      a global counter;
      a multilevel counter tree comprising a plurality of local counters, wherein a last level of the multilevel counter tree is associated with a plurality of Message Authentication Code (MAC) lines; and
      logic to perform a write operation to a memory address, wherein the logic is to decrypt one of the MAC lines associated with the memory address using a tweak based on one or more of the memory address, the global counter, the local counter associated with the one MAC line, and a counter indication bit to obtain a MAC value.

11. The system of claim 10, wherein the logic to perform the write operation to the memory address is further to:
   determine whether an address of the local counter associated with the one MAC line is greater than a counter index;
   assert the counter indication bit in response to a determination that the address of the local counter associated with the one MAC line is lesser than the counter index; and
   de-assert the counter indication bit in response to a determination that the address of the local counter associated with the one MAC line is greater than the counter index.

12. The system of claim 11, wherein the logic to perform the write operation to the memory address is further to:
   write data to the memory address; and
   update the one MAC line associated with the memory address with the MAC value.

13. The system of claim 12, wherein the logic to perform the write operation to the memory address is further to:
   determine whether an update interval has been reached;
   if so,
      reset one of the plurality of local counters associated with the current counter; and
      increment the counter index by one; and
   if not so,
      increment the local counter associated with the one MAC line by one.

14. The system of claim 13, wherein the logic to perform the write operation to the memory address is further to:
   determine another tweak based on one or more of the memory address, the global counter, the local counter associated with the one MAC line, and the counter indication bit; and
   encrypt the one MAC line associated with the memory address using the other tweak.

15. The system of claim 10, wherein the logic is further to:
   determine whether a counter index is set to its maximum value; and
   in response to a determination that the counter index is set to its maximum value, increment the global counter by one; and
   set the counter index to zero.

16. The system of claim 10, wherein the logic is further to perform a read operation to the memory address, wherein the logic is to decrypt the one MAC line associated with the memory address using the tweak to obtain the MAC value.

17. The system of claim 16, wherein the logic to perform the read operation to the memory address is further to:
   determine whether an address of the local counter associated with the one MAC line is greater than a counter index;
   assert the counter indication bit in response to a determination that the address of the local counter associated with the one MAC line is lesser than the counter index; and
   de-assert the counter indication bit in response to a determination that the address of the local counter associated with the one MAC line is greater than the counter index.

18. The system of claim 16, wherein the logic to perform the read operation to the memory address is further to:
   authenticate a data line associated with the memory address using the MAC value; and
   read contents of the data line in response to a successful authentication of the data line associated with the memory address using the MAC value.

19. A method comprising:
   performing a write operation to a memory address, wherein performing the write operation comprises decrypting one of a plurality of the Message Authentication Code (MAC) lines associated with the memory address using a tweak based on one or more of the memory address, a global counter, a local counter associated with the one MAC line, and a counter indication bit to obtain a MAC value, wherein the one of the plurality of MAC lines is associated with a last level of a multilevel counter tree.

20. The method of claim 19, wherein performing the write operation comprises:
   determining whether an address of the local counter associated with the one MAC line is greater than a counter index;
   asserting the counter indication bit in response to a determination that the address of the local counter associated with the one MAC line is lesser than the counter index; and
   de-asserting the counter indication bit in response to a determination that the address of the local counter associated with the one MAC line is greater than the counter index.

21. The method of claim 20, wherein performing the write operation comprises:
   writing data to the memory address; and
   updating the one MAC line associated with the memory address with the MAC value.

22. The method of claim 21, wherein performing the write operation comprises:
　determining whether an update interval has been reached; if so,
　　resetting one of the plurality of local counters associated with the current counter; and
　　incrementing the counter index by one; and
　if not so,
　　incrementing the local counter associated with the one MAC line by one.

23. The method of claim 19, wherein performing the write operation comprises:
　determining another tweak based on one or more of the memory address, the global counter, the local counter associated with the one MAC line, and the counter indication bit; and
　encrypting the one MAC line associated with the memory address using the other tweak.

24. The method of claim 19, wherein performing the write operation comprises:
　determining whether a counter index is set to its maximum value; and
　in response to a determination that the counter index is set to its maximum value, incrementing the global counter by one; and
　setting the counter index to zero.

25. The method of claim 19, further comprising:
　performing a read operation to the memory address, wherein performing the read operation comprises decrypting the one MAC line associated with the memory address using the tweak to obtain the MAC value.

26. The method of claim 25, wherein performing the read operation further comprises:
　determining whether an address of the local counter associated with the one MAC line is greater than a counter index;
　asserting the counter indication bit in response to a determination that the address of the local counter associated with the one MAC line is lesser than the counter index; and
　de-asserting the counter indication bit in response to a determination that the address of the local counter associated with the one MAC line is greater than the counter index.

27. The method of claim 26, wherein performing the read operation further comprises:
　authenticating a data line associated with the memory address using the MAC value; and
　reading contents of the data line in response to a successful authentication of the data line associated with the memory address using the MAC value.

\* \* \* \* \*